(12) United States Patent
Schneider et al.

(10) Patent No.: US 11,203,520 B2
(45) Date of Patent: Dec. 21, 2021

(54) PRESSURIZED LIQUID FILL GUN APPARATUS AND METHOD OF USE

(71) Applicant: Green CO2 IP LLC, Fort Collins, CO (US)

(72) Inventors: Daniel E. Schneider, Worland, WY (US); David L. Schneider, Worland, WY (US)

(*) Notice: Subject to any disclaimer, the term of this patent is extended or adjusted under 35 U.S.C. 154(b) by 62 days.

(21) Appl. No.: 16/691,920

(22) Filed: Nov. 22, 2019

(65) Prior Publication Data
US 2021/0155468 A1    May 27, 2021

Related U.S. Application Data

(60) Provisional application No. 62/772,794, filed on Nov. 29, 2018.

(51) Int. Cl.
| | | |
|---|---|---|
| *B67D 7/44* | (2010.01) | |
| *B65B 3/12* | (2006.01) | |
| *B65B 3/26* | (2006.01) | |
| *B67D 7/02* | (2010.01) | |
| *B67D 7/36* | (2010.01) | |

(52) U.S. Cl.
CPC ............. *B67D 7/44* (2013.01); *B65B 3/12* (2013.01); *B65B 3/26* (2013.01); *B67D 7/0205* (2013.01); *B67D 7/0294* (2013.01); *B67D 7/36* (2013.01); *F17C 2221/013* (2013.01)

(58) Field of Classification Search
CPC ...... B67D 7/44; B67D 7/0205; B67D 7/0288; B67D 7/0294; B67D 1/0831; B67D 1/0829–0855; B65B 3/12; F16L 37/413; F16L 37/14; F16L 37/142; F16L 37/146
See application file for complete search history.

(56) References Cited

U.S. PATENT DOCUMENTS

| | | | | |
|---|---|---|---|---|
| 3,490,483 | A | * | 1/1970 | Nicko ................. B67D 1/0802 137/212 |
| 3,567,175 | A | | 3/1971 | Sciuto |
| 3,583,667 | A | | 6/1971 | Amneus |
| 4,017,139 | A | * | 4/1977 | Nelson ................. F16L 37/133 439/352 |
| D248,041 | S | | 5/1978 | Persson |
| 4,978,150 | A | * | 12/1990 | Schoot ................. F16L 37/084 285/304 |
| D314,050 | S | | 1/1991 | Sone |
| 5,167,398 | A | | 12/1992 | Wade et al. |
| 5,911,403 | A | * | 6/1999 | deCler ................. B67D 7/0294 251/149.6 |
| 6,015,068 | A | * | 1/2000 | Osgar ................... B67D 7/344 222/400.7 |

(Continued)

OTHER PUBLICATIONS

International search report for PCT/US2019/062784.
Photograph of fill gun believed to be in use since at least 2012.

*Primary Examiner* — Andrew D StClair
(74) *Attorney, Agent, or Firm* — Talus Law Group LLC (57) ABSTRACT

Certain embodiments of the present invention provide a fill gun apparatus for interconnection of a pump truck and a pressurized liquid delivery system. The fill gun apparatus can be easily attached and detached from an inlet port to deliver a pressurized fluid, for improved delivery, increased efficiency, increased safety, and decreased waste.

12 Claims, 8 Drawing Sheets

(56) References Cited

U.S. PATENT DOCUMENTS

| | | | |
|---|---|---|---|
| 7,258,127 B1 | 8/2007 | Schneider | |
| D661,785 S | 6/2012 | Johnson | |
| 8,356,794 B1 * | 1/2013 | Liu | F16L 37/23 |
| | | | 251/149.9 |
| 8,377,010 B2 | 2/2013 | Harding et al. | |
| 8,641,013 B2 | 2/2014 | Liu | |
| 8,641,605 B2 | 2/2014 | Shoroji et al. | |
| D701,111 S | 3/2014 | Bianco et al. | |
| 8,844,555 B2 | 9/2014 | Schneider | |
| D721,266 S | 1/2015 | Sun | |
| 9,017,295 B2 | 4/2015 | Pan | |
| 9,168,203 B2 | 10/2015 | Rosenquist et al. | |
| D780,891 S | 3/2017 | Endo | |
| 9,933,094 B2 | 4/2018 | Fangrow | |
| D841,782 S | 2/2019 | Wada | |
| 2013/0320673 A1 | 12/2013 | Hopson | |
| 2015/0157848 A1 | 6/2015 | Wu et al. | |
| 2015/0247594 A1 | 9/2015 | Vijayadevaraj et al. | |
| 2017/0023179 A1 | 1/2017 | Schneider | |

* cited by examiner

PRESSURIZED LIQUID FILL GUN APPARATUS AND METHOD OF USE

CROSS REFERENCE TO RELATED APPLICATIONS

This application claims benefit to provisional patent application No. 62/772,794, entitled "PRESSURIZED LIQUID FILL GUN APPARATUS AND METHOD OF USE", filed Nov. 29, 2018, which is incorporated by reference in its entirety for all purposes.

FIELD OF THE INVENTION

The present invention is directed to fill gun apparatus for the delivery of pressurized fluid products used for beverage, welding, medical and other fields and methods of use thereof.

BACKGROUND OF THE INVENTION

The fill gun apparatus and method of use of the present invention may have applications in additional other industries using carbon dioxide or similar systems, such as fire protection systems, welding, medical, and other industries using pressurized liquids, such as represented in U.S. Pat. No. 2,363,200 relating to a gas dispensing system. U.S. Pat. Nos. 2,813,402, 3,392,537 and 6,601,618 disclose generic liquefied gas system relevant to wide applications. The discussion in this application, however, will relate primarily to the beverage dispensing industry.

The beverage industry uses carbon dioxide to carbonate and to move beverages from a storage tank to a dispensing area. For beverages such as beer, the beer can be contained in large kegs in a remote location, e. g., the basement or storage room, and the taps at the bar can dispense the beer. This method eliminates the storage of beer kegs in the bar area and allows the beer keg delivery and removal to occur in an area other than that in which patrons may be sitting.

In order to get the beverages from the storage area to the serving area, prior art has used carbon dioxide among other gases. The carbon dioxide is generally delivered as a liquid in large heavy DOT cylinders and hooked to the dispensing system. When the tanks are hooked to the system, a certain volume, generally about one third of the tank, in a one tank system or one third of the tank volume in a multi-tank system is not filled with liquid. This allows the carbon dioxide to boil to a gaseous state. It is this gaseous state that is then used to carbonate and to move the desired beverage from the storage room or basement to the delivery area and provide much of the carbonation to the beverages.

One problem with this general system is that the carbon dioxide tanks must be changed or when the current tanks run out, they must be replaced with new tanks. This can be inconvenient and time consuming. If only one person is working, then they are required to leave the patron area and manually change the tank to allow the refreshments to continue to flow. In addition, delivery of additional filled tanks cannot always occur when they are needed if a user runs out in the late evening or during non-business hours. This problem can be somewhat lessened by using multiple liquid tanks, but this uses more space and can be more expensive to monitor and refill.

To refill or replace a tank, the system must generally be completely shut down, so no beverages can be served, and service or delivery personnel can move the full liquid carbon dioxide tanks into the business and remove the empty tanks. Generally, several valves must be shut off while the tanks are changed. The business must wait until the changeover is complete before beverages can be served again.

Some systems exist where the physical changing of the tanks has been eliminated. This is done by delivering liquid carbon dioxide to the tanks or system pre-existing in the businesses. Generally, a pump truck delivers the liquid carbon dioxide to a fill line plumbed to the outside of the building. The delivery personnel must then enter the establishment to close and adjust various valves. The system is then shut down and the dispensing of beverages must cease until the filling process is complete. Delivery personnel must then return to the truck and start the pump. They must then carefully watch the system to attempt to determine when the system is full. This can be difficult to determine with any uniformity. Some weeks a business may do very well with beverages and some weeks may not do so well. While an operator may get a general sense, it is difficult to determine without the trial and error method, when the system is full.

Some art uses relief valves to indicate when the system is full. The relief valves release carbon dioxide from the system when a predetermined pressure is met. This method of determining when the system is full is wasteful and can result in increased pressure hazards from overfilling. Overfilling can also result in the system operating improperly because the system needs to maintain the proper liquid gas ratios and overfilling lessens the efficiency of the system as a whole.

When the delivery person determines that the system is full, the process of opening and adjusting various valves must again occur before the truck is disconnected from the system. While these types of systems do eliminate much of the inconvenience of physically changing out tanks, there are still significant disadvantages to this liquid delivery system common in the art.

U.S. Pat. No. 6,601,618, noted above and incorporated by reference, discloses a filling apparatus that is made up of a gas passage connected to a storage tank via a connection passage, a first gas valve that opens and closes the gas passage, a pressure gas passage connected to a pressure gas supply source, a pressure gas valve that opens and closes the pressure gas passage, an exhaust passage that allows an interior of a container to communicate with the external thereof, and an exhaust valve that opens and closes the exhaust passage. With this filling apparatus, before a pressurized filling operation, both the gas passage and the pressure gas passage are opened to pressurize the interior of the container with a carbonated gas supplied through both passages. Further, before an unpressurized filling operation, both the gas passage and the pressure gas passage are opened to perform a flushing operation in which droplets are discharged from the gas passage with air exhausted from the container into the storage tank via the gas passage. Then, after the filling operation, both the gas passage and the exhaust passage are opened to discharge a certain amount of filling liquid remaining in the gas passage, into the container.

U.S. Pat. Nos. 5,113,905 and 4,936,343, both of which are incorporated by reference, disclose a carbon dioxide fill manifold and method for using which is designed to provide an end-user with an uninterrupted supply of carbon dioxide gas, while at the same time eliminating the necessity of transporting individual, conventional pressurized bottles to be refilled. In an embodiment the carbon dioxide fill manifold includes a fill line valve connected to an atomizer for receiving a fill line and introducing liquid carbon dioxide into the atomizer, liquid cylinder ports provided in the atomizer for connecting a pair of liquid chambers to the atomizer and receiving and storing the liquid carbon dioxide, a gas cylinder port provided in the atomizer for connecting a vapor container to the atomizer and receiving gaseous carbon dioxide generated in the atomizer and a service line valve also connected to the atomizer for receiving a service lien valve and servicing the end user with gaseous carbon dioxide. A pressure actuated valve is also provided in the atomizer for periodically replenishing the supply of gaseous carbon dioxide from the liquid containers responsive to a selected pressure differential across the pressure actuated valve. A pressure relief valve is seated in the atomizer to guard against excessive liquid carbon dioxide system pressure. U.S. Pat. No. 4,683,921, incorporated by reference, discloses a carbon dioxide fill manifold and method for using which is designed to provide an end-user with an uninterrupted supply of carbon dioxide gas, while at the same time eliminating the necessity of transporting individual, conventional pressurized bottles to be refilled. In an embodiment the carbon dioxide fill manifold includes a fill line valve connected to an atomizer for receiving a fill line and introducing liquid carbon dioxide into the atomizer, liquid cylinder ports provided in the atomizer for connecting a pair of liquid chambers to the atomizer and receiving and storing the liquid carbon dioxide, a gas cylinder port provided in the atomizer for connecting a vapor container to the atomizer and receiving gaseous carbon dioxide generated in the atomizer and a service line valve also connected to the atomizer for receiving a service lien valve and servicing the end user with gaseous carbon dioxide. A pressure actuated valve is also provided in the atomizer for periodically replenishing the supply of gaseous carbon dioxide from the liquid containers responsive to a selected pressure differential across the pressure actuated valve. A pressure relief valve is seated in the atomizer to guard against excessive liquid carbon dioxide system pressure.

There has been a need for a new approach for the liquid carbon dioxide and other pressurized gas delivery business. U.S. Pat. No. 7,258,127, titled "Pressure Valve and Diverter System" to Schneider ("the '127 Patent"), incorporated by reference in its entirety, addressed some of the problems with the prior art and provides a diverter valve, system and method for the delivery of gases or liquids where the delivery persons can fill the system without having to enter the building and the system can continue to deliver gas to the user. There is no interruption of service while the system is being filled.

Japanese application 2004-528969 discloses what is described as a carbonation chamber that is of general relevance to the present invention.

U.S. Patent publication 2002-0179177 and Japanese applications 2006-264716 and 3187052 may all be described as being generally related to the state of the art of the present invention.

SUMMARY OF THE INVENTION

In view of disadvantages of present technologies surrounding the delivery of pressurized products into systems using gases there is a need for a fill gun apparatus to increase delivery efficiency, reduce risk, and reduce waste. Certain embodiments of the present invention provide a product filling apparatus for connection between a pump truck and a delivery system. The fill gun apparatus can be easily attached and detached from an inlet port to deliver a pressurized fluid, for improved delivery, increased efficiency, increased safety and decreased waste. Embodiments of the present invention can be used with the valves, systems, and methods disclosed in the '127 Patent and U.S. Pat. No. 8,444,555 to Schneider ("the '555 Patent"), titled CO2 System Pressure Control Valve, each of which incorporated by reference in their entirety.

Certain embodiments of the present invention surround a pressurized liquid fill gun apparatus having a quick connection for the connection to a coupler of an inlet port. Quick connections include connections having a retaining mechanism that allow rapid connection and disconnection of two mating elements. Exemplary quick connections include a cam locking mechanism, a bayonet coupling, a v-band clamp, quick-disconnect hose couplings, cam-and-groove hose couplings, grip-lock hose couplings, twist-claw hose couplings, or other quick connections means known to those skilled in the art. A quick connection used with the present invention can be quickly connected to or disconnect from an inlet port without risk of unintentional disconnection. Furthermore, using a quick connection allows for easy disconnection after delivery of pressurized products, particularly if the connection between the delivery apparatus and the inlet port freezes during the delivery process. The quick connection allows a user to rapidly connect the apparatus to and disconnect the apparatus from a coupler of an inlet port.

Certain embodiments comprise a quick connection having a sleeve surrounding an inlet line. The sleeve is configured to be placed around a coupler of an inlet port, with the inlet line disposed within an aperture in the coupler. The sleeve has a plurality of pins extending radially inward from the sleeve. The pins mate with surface slots in the external surface of the coupler. When the pins are engaged with the surface slots, the sleeve can be rotated around the coupler to traverse the pins into pin retainers. Pin retainers serve to constrain the pins, and thus constrain the apparatus from unintentional disconnection from the inlet port. Certain embodiments comprise a quick connection having a compression spring to provide an expansion force to retain the pins within the pin retainers.

Embodiments of the present invention comprise a pressurized liquid fill gun apparatus for the delivery of pressurized products into systems through inlet ports such as those disclosed by a pressure diverter valve system as disclosed in the '127 Patent. Other embodiments are configured for mating with a coupler attached to an inlet port.

Certain embodiments comprise a first sleeve that mates with a second sleeve to provide increased surface area. The increased surface area provides an operator with additional area to grasp, manipulate, and carry the fill gun apparatus. In certain embodiments, a sleeve further comprises an annular ledge. An annular ledge provides increased rotational leverage for the attachment and detachment of a sleeve to a coupler. It will be appreciated that an annular ledge may be located anywhere between a first end and a second end of the sleeve, and that there may be more than one annular ledge located on the sleeve. Certain embodiments comprise an annular ledge attached to an outer surface of a sleeve with the annular ledge consistent with a first end of the sleeve.

Certain embodiments of the present invention comprise elements that assemble using threading specified as American National Standard Taper Pipe Thread, herein referred to as NPT, specified by ASME B 1.120.1-2013 (American Society of Mechanical Engineers, 2013, "American Standard Taper Pipe Thread," ASME B1.120.1-2013). However, it will be appreciated by those skilled in the art, that the fill gun apparatus for the delivery of pressurized product (e.g. liquid carbon dioxide) may be assembled in a variety of ways known to those skilled in the art.

Certain embodiments comprise fill gun apparatus having sliding components. The sliding components comprise materials with a low coefficient of friction to reduce degradation between sliding parts. It will be appreciated that the materials of the sliding components may include but are not limited to brass, bronze, Polyoxymethylene (POM), Poly-TetraFluoroEthylene, or other materials known to have low coefficient of friction, or high lubricity. Such materials may also be used for components such as bushings, washers and other components that slide against another component.

Certain embodiments comprise a fill gun apparatus configured to mate with the inlet port of a pressure diverter valve and system disclosed in the '127 Patent. The fill gun apparatus allows an operator to fill a system while connected to a coupler having a connection to an inlet port. An operator connects the fill gun apparatus of the present invention to a coupler of an inlet port to allow the delivery of a product into the system, such as pressurized liquid carbon dioxide into a carbon dioxide delivery system. The operator actuates a valve of the fill gun apparatus from a first configuration, which prevents the flow of fluid, to a second configuration. While the valve is in the second configuration, fluid can flow between a first port in fluid communication with the truck, and a second port in fluid communication with the inlet port. When the system is full, the pump truck senses a change in pressure and automatically stops the delivery of product. Although the delivery of product ceases, a pressurized segment of the delivery system may exist within the carbon dioxide delivery system and the inlet port. Prior to the detaching the fill gun apparatus from the coupler, an operator can actuate the valve to a third configuration, allowing the passage of product between the first port and a third port having fluid communication with the atmosphere. Actuation to this third configuration acts to purge potential pressurized product remaining between the apparatus and the pump truck after the filling operation.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

BRIEF DESCRIPTION OF THE DRAWINGS

FIG. 1B—A cross-sectional view of an embodiment of an inlet line of the delivery apparatus.

FIG. 2A—An exploded view of an embodiment of the of the delivery apparatus.

FIG. 2B—A side view of an embodiment of an inlet line of the delivery apparatus and a cross-sectional view of a coupler.

FIG. 4A—A side view of certain embodiments of the delivery apparatus.

FIG. 4B—A cross-sectional view of an embodiment of a sleeve of the delivery apparatus.

FIG. 4C—A cross-sectional view of an embodiment of the delivery apparatus.

FIG. 4D—A side view of an embodiment of a bushing of the delivery apparatus.

FIG. 4E—A cross-sectional view of an embodiment of a bushing of the delivery apparatus.

FIG. 5B—A cross-sectional view of an embodiment of a pin of the delivery apparatus.

FIG. 5C—A side view of an embodiment of a coupler.

FIG. 6A—A cross-sectional view of an embodiment of a sleeve of the delivery apparatus.

FIG. 6B—A cross-sectional view of an embodiment of the delivery apparatus.

FIG. 6C—A cross-sectional view of an embodiment of the delivery apparatus.

FIG. 6D—A plan view of an embodiment of a washer of the delivery apparatus.

FIG. 6E—A plan view of an embodiment of a washer of the delivery apparatus.

FIG. 6F—A plan view of an embodiment of a washer of the delivery apparatus.

DETAILED DESCRIPTION OF VARIOUS EMBODIMENTS

Figure 1A:
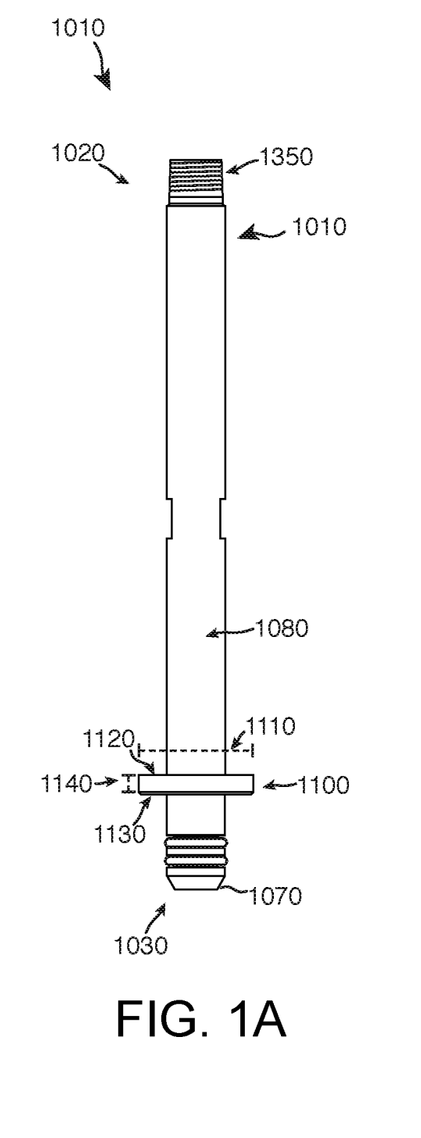
FIG. 1A—A side view of an embodiment of an inlet line of the delivery apparatus.
Figure 1B:
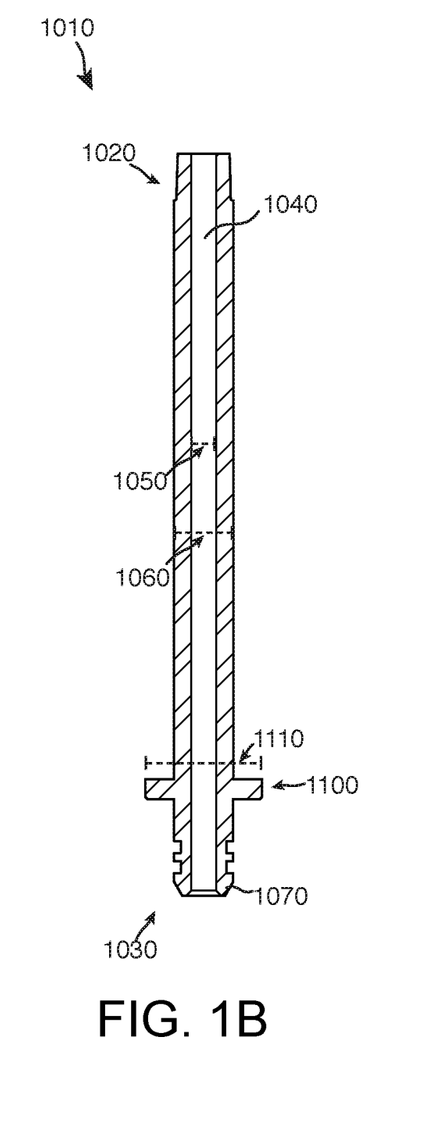

Certain embodiments of the present invention comprise a delivery apparatus for the delivery of liquid product further comprise an inlet line 1010, seen in FIG. 1A and FIG. 1B, of a generally tubular form having a first end 1020, a second end 1030 and a hole 1040 extending between the first end 1020 and second end 1030. The inlet line 1010 further comprises a first internal diameter 1050 and a first external diameter 1060. The inlet line 1010, further comprises an annular ledge 1100 located between the first end 1020 and the second end 1030 of the inlet line. The annular ledge 1100 extends radially outward from an external surface 1080 of the inlet line and has a diameter 1110 larger than the first external diameter 1060 of the inlet line. The annular ledge 1100 further comprises a first surface 1120 and a second surface 1130.

Certain embodiments comprise an inlet line 1010, seen in FIG. 1A and FIG. 1B, having a chamfer 1070 on a second end 1030 of the inlet line. The chamfer 1070 in some embodiments has a depth of 0.44 cm (0.173 in) and an angle of 60°. The chamfer 1070 as seen, assists in the alignment of an inlet line 1010 when inserted into a receiving element.

Certain embodiments, seen in FIG. 1A and FIG. 1B, comprise an inlet line 1010 having a first internal diameter 1050 of 0.795 mm (0.313 in), and a first external diameter 1060 of an inlet line of 1.88 cm (0.74 in). Other embodiments comprise an inlet line 1010 have an annular ledge 1100. The annular ledge 1110 can have a diameter 1110 of 3.68 cm (1.450 in) and a thickness 1140 of 0.635 cm (0.250 in).

Figures 2A, 2B:
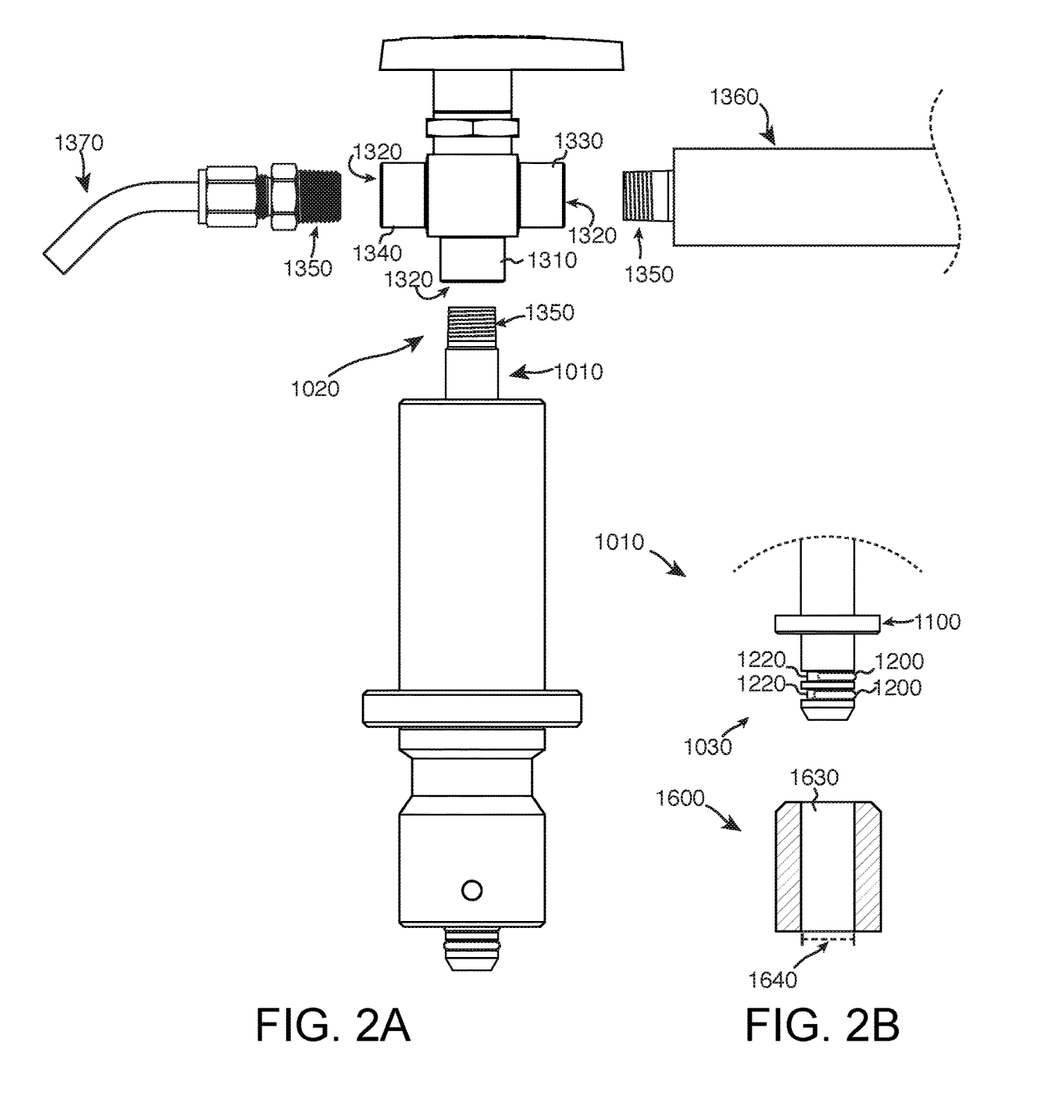

Certain embodiments, seen in FIG. 2A, comprise an inlet line 1010 and a valve 1300, with a first end 1020 of the inlet line affixed to a first port 1310 of the valve in a manner to prevent the unintentional leaking of pressurized product to the ambient environment. The first end 1020 of the inlet line can comprise a male threaded feature 1350 configured to mate with the first port 1310 of the valve having a female threaded feature 1320. The male threaded feature 1350 and the female threaded feature 1320 comprises threading consistent 3/8-18 American National Standard Taper Pipe Thread (NPT). It will be appreciated that an inlet line 1010 may be affixed to a port of a valve using other attachment methods known to those skilled in the art.

In certain embodiments, the valve 1300, as seen in FIG. 2A, comprises a first port 1310, a second port 1330, and a third port 1340, each with a female threaded feature 1320 for attachment to using a male threaded feature 1350. The valve 1300, in a first configuration prevents the passage of fluid through the valve 1300. A second configuration of the valve 1300 allows the passage of fluid between the first port 1310, and the second port 1330. A third configuration of the valve 1300 allows the passage of fluid between the second port 1330 and the third port 1340.

Certain embodiments seen in FIG. 2A, further comprise a handle 1360. A handle 1360 has a tubular form for the passage of product and can be affixed to a first port 1310 of a valve. The valve comprises a first port 1310, a second port 1320, and a third port 1330. Certain embodiments comprise a vent tube 1370. The vent tube 1370 comprises a tubular form and can be affixed to the third port 1340 of a valve.

As seen in FIG. 2B, certain embodiments comprise an inlet line 1010 having a first circumferential ring 1200 between an annular ledge 1100 and the second end 1030 of the inlet line. The first circumferential ring 1200 provides a perimetral seal between the inlet line 1010 and the coupler 1600 by mating with a hole 1630 of the coupler. The first circumferential ring 1200 may comprise any sealing mechanism known to those skilled in the art including but not limited to, O-rings, E-rings, B-rings, shaft seals, U-cup seals, ring seals and other annular type seals. The circumferential ring 1200 of the present embodiment comprises an O-ring comprising Buna-N able to withstand below freezing temperatures without degradation of functionality. The circumferential ring 1200 can have an outer diameter of 1.92 cm (0.755 in) and a cross-sectional diameter of 0.261 cm (0.103 in) prior to installation. Circumferential rings may be made of materials including, Buna-N, Viton®, polyurethane, silicone, fluorosilicone, PolyTetraFluoroEthylene (PTFE) and ethylene propylene diene monomer (EPDM) rubber. The circumferential ring 1200 is disposed in a first groove 1220 in the external surface 1080 of the inlet line. In certain embodiments, groove 1220 has a depth of 0.434 cm (0.171 in) and height of 1.92 cm (0.150 in). Once installed into the first groove 1220, the circumferential ring 1200 is deformed to have has a maximum diameter 1210 equal to or greater than the first external diameter 1060 of the inlet line. In certain embodiments, the maximum diameter 1210 of the circumferential ring is greater than the diameter 1640 of a hole of a coupler, and the cross-sectional diameter is deformable.

Certain embodiments, seen in FIG. 2B, comprise a first groove 1220 and a second groove 1220 for the placement of a first circumferential ring 1200 and a second circumferential ring 1200. It will be appreciated that additional circumferential rings may be used to increase sealing between the inlet line 1010 and the hole 1630 of a coupler.

Figure 3:
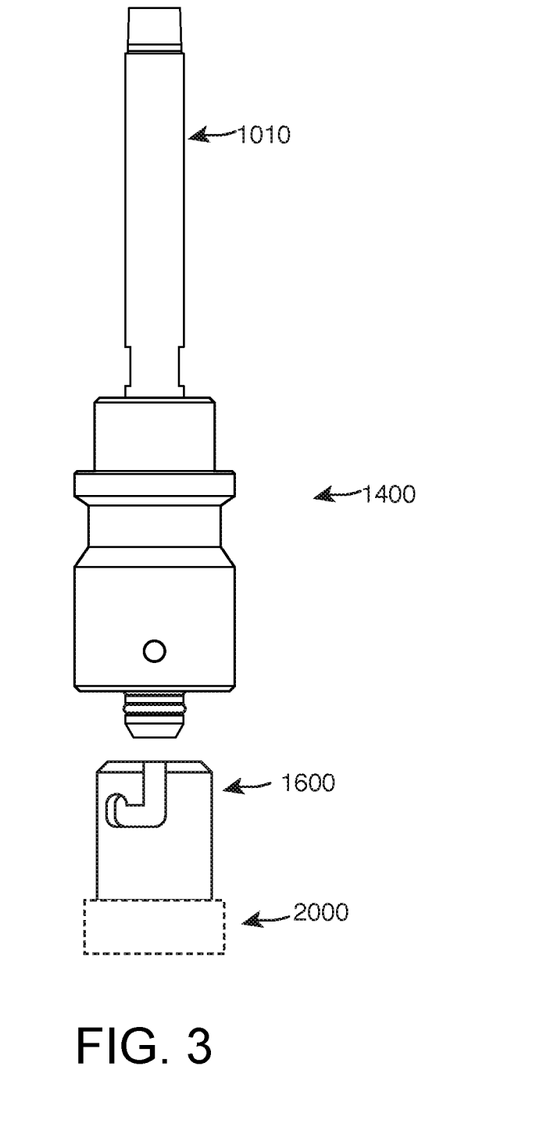
FIG. 3—A side view of certain embodiments of the delivery apparatus.

As seen in FIG. 3, certain embodiments comprise an inlet line 1010 having a first end (not shown), a second end 1030, an annular ledge 1100, and a first external diameter 1060. The first external diameter 1060 of the inlet line is equal to or less than the internal diameter of a hole of a coupler 1600. Certain embodiments of comprise coupler 1600 having a hole with diameter of about 0.740 in to 0.745 in. Typically, the inlet line 1010 is configured to have an engineering fit such as a sliding or loose sliding fit with the hole such as dictated by ASME Y14.5 (American Society of Mechanical Engineers, 2009, "Dimensioning and Tolerancing," ASME Y14.5).

Certain embodiments, seen in FIG. 3, comprise a fill gun apparatus 1000 having an inlet line 1010 and a sleeve 1400. The sleeve 1400 is mated with the inlet line 1010 wherein the sleeve 1400 affix the fill gun apparatus 1000 to a coupler 1600. The coupler 1600 is connected to an inlet port 2000 allowing the delivery of a pressurized liquid through an inlet port 2000 such as disclosed by the '127 Patent.

Figures 4A, 4B, 4C, 4D, 4E:
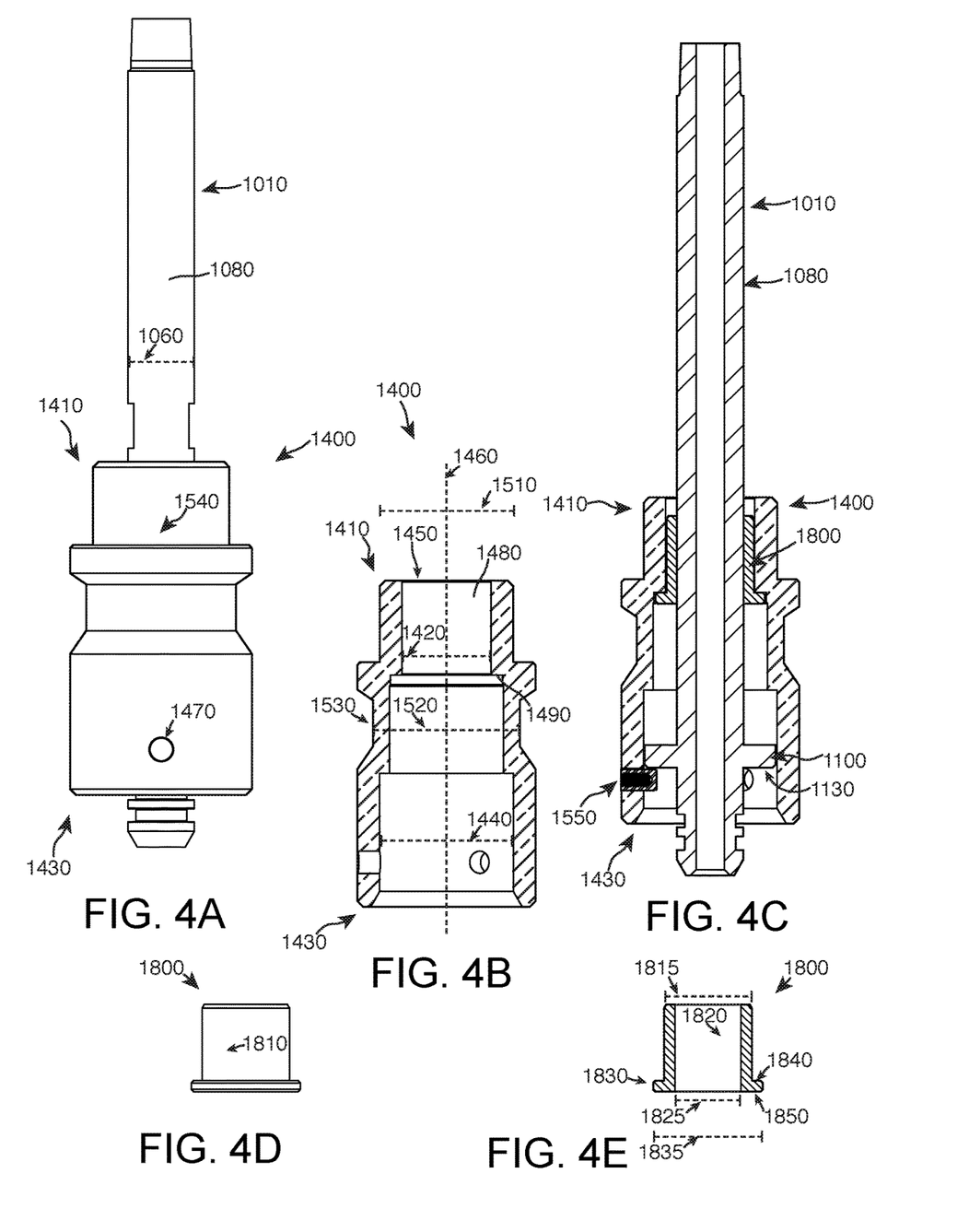

Certain embodiments of the present invention comprise a sleeve 1400 disposed over an inlet line 1010, seen in FIG. 3 and FIG. 4A. The interface between the sleeve 1400 and the inlet line 1010 can comprise a sliding fit. The sleeve 1400, referencing FIG. 4B, has a first end 1410 with a first internal diameter 1420 of 2.54 cm (1.00 in) of and a second end 1430 with a second internal diameter 1440 of 3.25 cm (1.28 in). The sleeve 1400 further comprises a hole 1450 extending between the first end 1410 and the second end 1430 of the sleeve. The first internal diameter 1420 of the sleeve is larger than a first external diameter 1060, seen in FIG. 4A, of the inlet line, but smaller than the diameter 1110 (FIG. 4C) of an annular ledge. The second diameter 1440 (FIG. 4B) of the sleeve is larger than the diameter 1110 (FIG. 4B) of the annular ledge. The sleeve 1400, once again referencing FIG. 4B, further comprises a fixation mechanism that allows the sleeve 1400 to affix to a coupler 1600. In certain embodiments, a fixation mechanism actuates rotatively about an axis 1460. The fixation mechanism can comprise a pin 1550, seen in FIGS. 5A-C, for indexing into mating elements.

As seen in FIG. 4B, certain embodiments comprise a sleeve 1400, having a first external diameter 1510 and a second external diameter 1520 which creates a waist 1530 in the external surface 1540 of the sleeve. A waist 1530 allows the operator to more easily manipulate the sleeve over the coupler 1600.

As seen in FIG. 4C, certain embodiments comprise a bushing 1800 disposed between a sleeve 1400 and an inlet line 1010. As seen in FIG. 4D and FIG. 4E, the bushing can comprise an external surface 1810, having a first external diameter 1815 configured to interface with an internal surface 1480 (FIG. 4B) of a sleeve. The bushing 1800, seen in FIG. 4E, comprises an internal surface 1820, having a first internal diameter 1825, configured to interface with an external surface 1080 (FIG. 4A) of an inlet line. In certain embodiments, bushing 1800, seen in FIG. 4E, comprises an annular ledge 1830, having a diameter 1835. The annular ledge 1830, comprises a first surface 1830 and a second surface 1840, wherein the first surface is configured to interface with the internal step surface 1500 of the sleeve. As seen in FIG. 4C, bushing 1800 is configured to have a press-fit interface with the sleeve 1400 and a sliding interface with the external surface 1080 of the inlet line in certain embodiments. Thus, the sleeve 1400 is slidably adjustable along the external surface 1080 of the inlet line. Bushing 1800 can comprise PTFE.

Figure 5A:
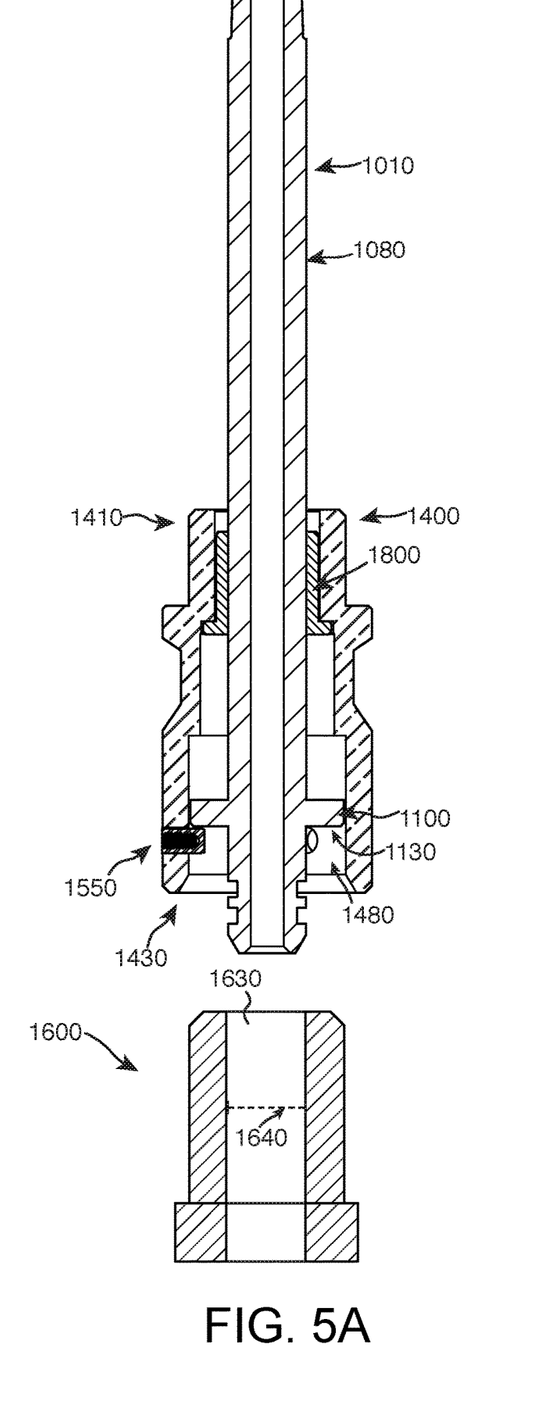
FIG. 5A—A cross-sectional view of an embodiment of the delivery apparatus in relation to a coupler.
Figure 5B:
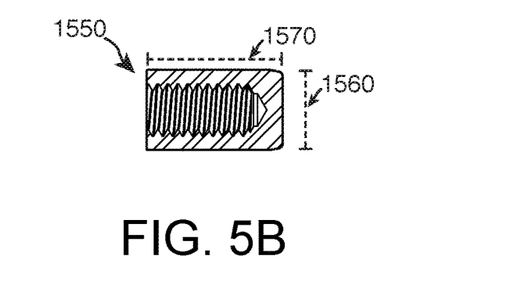

Certain embodiments seen in FIG. 5A, comprise an inlet line 1010 with an annular ledge 1100. As seen in FIG. 5A, the a sleeve 1400 has a pin 1550 extending inward from an internal surface 1480 of the sleeve, proximal to the second end 1430 of the sleeve. As seen in FIG. 5B, in certain embodiments, the pin 1550, has a diameter 1560 of 0.64 cm (0.25 in) and length 1570 of 1.08 cm (0.424 in), internal threading of #8-32 threading and a thread depth of 0.848 cm (0.334 in). The pin 1550, as seen in FIG. 5A, can be affixed to the internal surface 1480 of the sleeve, close to the second end 1430 of the sleeve. As seen in FIG. 4C, in certain embodiments, the pin 1550 can be press-fit into apertures 1470 through sleeve. The sleeve 1400 is disposed around the inlet line 1010. The pin 1550 extends inward such that it may contact a second surface 1130 of the annular ledge 1100. The second end 1430 of the sleeve, as seen in FIG. 5A, is configured to slidably mate over a first end 1610 of a coupler 1600. The coupler 1600 comprises a first end 1610, a second end 1620, and a hole 1630 extending therebetween. The second end of the coupler 1620, in certain embodiments, is configured to affix to an inlet port 2000. The hole 1630 of the coupler is configured to slidably mate with the inlet line 1010 inserted into the hole 1630 of the coupler. In certain embodiments, there may be two or more pins 1550 radially spaced apart and affixed to the internal surface 1480 of the sleeve.

Figure 5C:
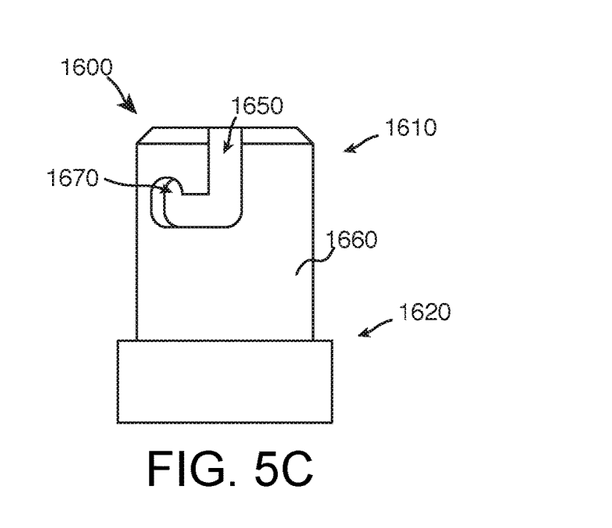

Certain embodiments as seen in FIGS. 5A-C, comprise a pin 1550 that slidably mates with a surface slot 1650 in an external surface 1660 of a coupler. Once the pin 1550 is indexed into the surface slot 1650 of the coupler, the sleeve 1400 is rotated to traverse the pin 1550 through the surface slot 1650 to a pin retainer 1670. The pin retainer 1670 serves to prevent a pin 1550 from unintentionally disengaging from the surface slot 1650 of the coupler. In some embodiments, a surface slot 1650 of a receiver begins coincident with a first end 1610 of the coupler and traverses radially around the coupler 1600 and away from the first end 1610. At the termination of the surface slot 1650 in the embodiment seen in FIG. 5, the surface slot 1650 traverses back toward the first end 1610 of the coupler to form a pin retainer 1670. In certain embodiments, there may be two or more surface slots 1650 radially spaced apart on the external surface 1660 of the coupler and corresponding with the spaced relationship of the pins 1550 affixed to the internal surface 1480 of the sleeve.

Figures 6A, 6B:
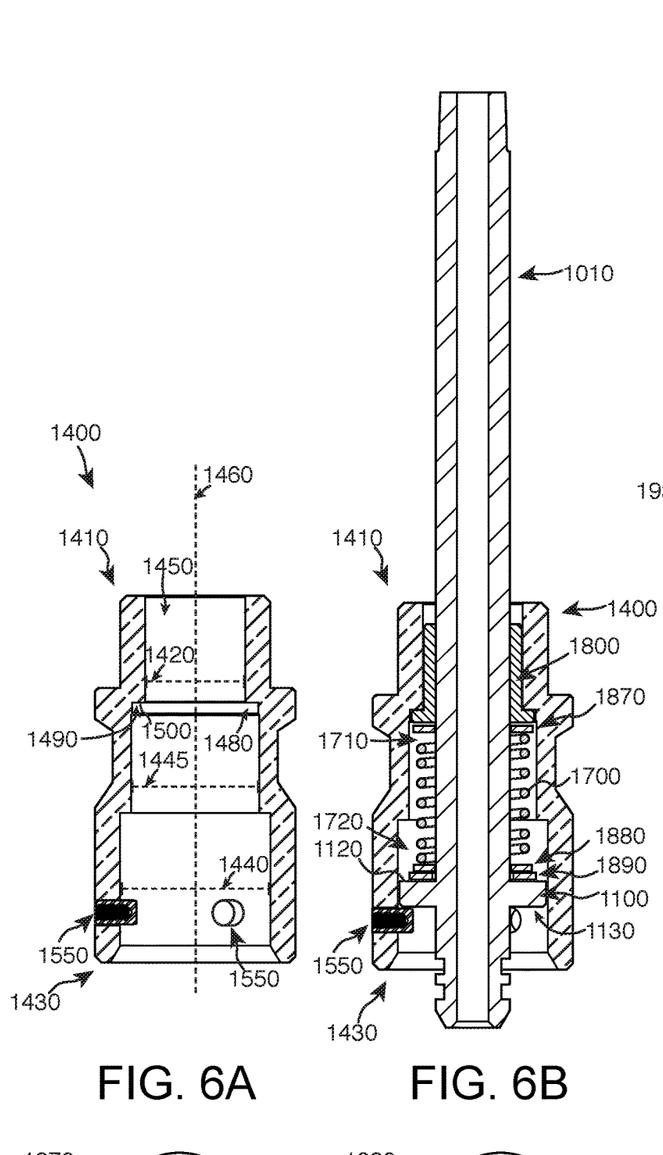

Certain embodiments, seen in FIG. 6A, comprise a sleeve 1400 having a first end 1410, a second end 1430, a first internal diameter 1420 and a second diameter 1440. The sleeve 1400 further comprises an internal step feature 1490 between the first end 1410 and the second end 1430. The internal step feature 1490 comprises a third internal diameter 1445, larger than the first internal diameter 1420, thus creating an internal step surface 1480 which is substantially orthogonal to the hole 1450 between the first end 1410 and second end 1430 of the sleeve. Certain embodiments have a third diameter 0.660 cm (0.260 in).

As seen in FIG. 6B, certain embodiments comprise a sleeve 1400 assembled over an inlet line 1010 having a compression spring 1700 having a first end 1710 and a second end 1720. The compression spring is disposed between an internal step feature 1490 and the annular ledge 1100 of the inlet line 1010. The compression spring 1700 provides an expansion force between the internal step feature 1490 of the sleeve and the annular ledge 1100 and biases the sleeve in a axial direction away from second end 1030 of the inlet line. Pin 1550 laterally contacts a second surface 1130 of the annular ledge to prevent the pin 1550 from being displaced beyond the second surface 1130 of the annular ledge due to the expansion force of the compression spring 1700. When assembled with a coupler 1600 (FIG. 5C), the expansion force of the compression spring 1700 acts to constrain the pin 1550 within a pin retainer 1670. Thus, the sleeve 1400 is rotatively constrained with the coupler 1600, and prevents unintentional disconnection between the fill gun apparatus 1000 and the coupler 1600.

As seen in FIG. 6B, certain embodiments include at least one washer. The washer 1870 has an internal diameter 1871 and an external diameter 1872. The first washer 1870, referencing FIG. 6B, is disposed between a first end 1710 of a compression spring and a second surface 1850 of an annular ledge of a bushing. Other embodiments comprise a plurality of washers. A second washer 1880, seen in FIG. 6E, has an internal diameter 1881 and an external diameter 1882. The second washer 1880, referencing FIG. 6B, is disposed between a second end 1720 of a compression spring and a first surface 1120 of an annular ledge of an inlet line. Certain embodiments further comprise third washer 1890. The third washer 1890, seen in FIG. 6F, comprises an internal diameter 1891 and an external diameter 1892. The third washer 1890, referencing FIG. 6B, is a slip washer disposed between the second washer 1880 and the first surface 1120 of the annular ledge of the inlet line. It will be appreciated that washers 1870, 1880, and 1890 may comprise materials such as stainless steel, aluminum, galvanized steel, materials with a low coefficient of friction such as PTFE, high density polyethylene (HDPE) or POM, or other materials known to those skilled in the art for the purposes of a washer.

Figure 6C:
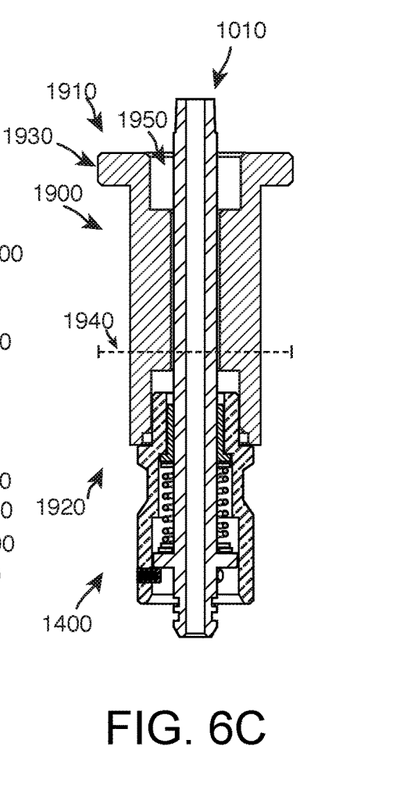
Figure 6D:
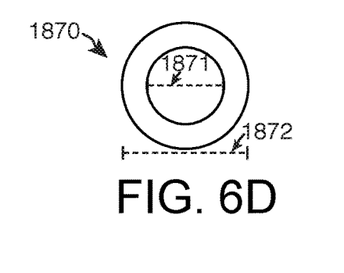
Figure 6E:
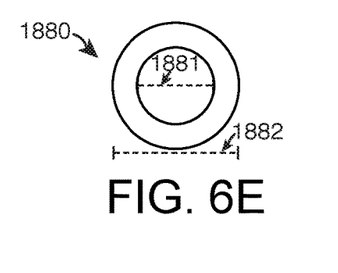
Figure 6F:
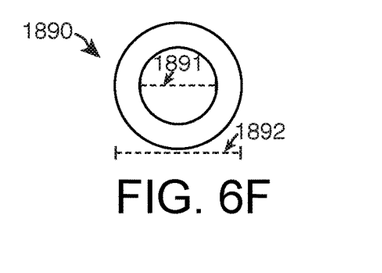

Certain embodiments seen in FIG. 6C, further comprises a sleeve 1900 having a first end 1910 and a second end 1920. The second end 1920 of the second sleeve is configured to mate with the first end 1410 of a first sleeve, thus extending a first sleeve 1400 and providing increased surface area. Certain embodiments of a sleeve 1900, further comprises an annular ledge 1930. Typically, consistent with the first end 1910 of the second sleeve, annular ledge 1930 has a first diameter 1940 greater than a first external diameter of the first sleeve 1400. Certain embodiments of a second sleeve 1900, further comprise a recess consistent with the first end 1910 of the second sleeve.

Figure 7:
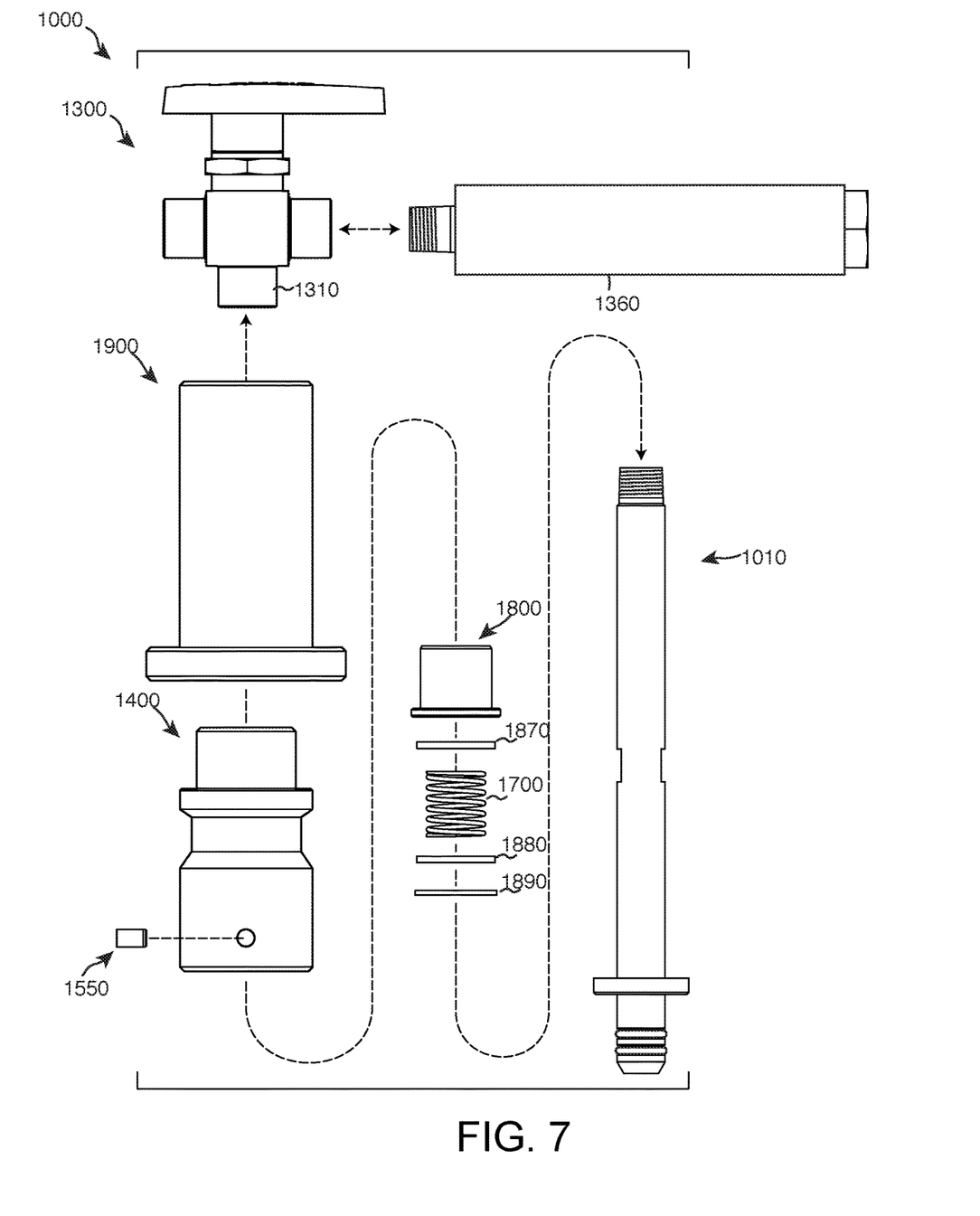
FIG. 7—An exploded view of an embodiment of the delivery apparatus.

Certain embodiments as seen in FIG. 7, comprise an assembly of individual components of the fill gun apparatus 1000 for the delivery of pressurized fluid. The assembly comprises a valve 1300, a handle 1360, a first sleeve 1400, a second sleeve 1900, a bushing 1800, a first washer 1870, a compression spring 1700, a second washer 1880, a third washer 1880, an inlet line 1010 and a pin 1550. The valve comprises a first port 1310, a second port 1320, and a third port 1330. The valve 1300 has a first position which prevents the flow of fluid, a second position which allows fluid flow between first port 1310 and third port 1330 in fluid communication with handle 1360, and third position which allows fluid flow between first port 1310 and third port 1330 in fluid communication with the vent tube 1370.

Figure 8:
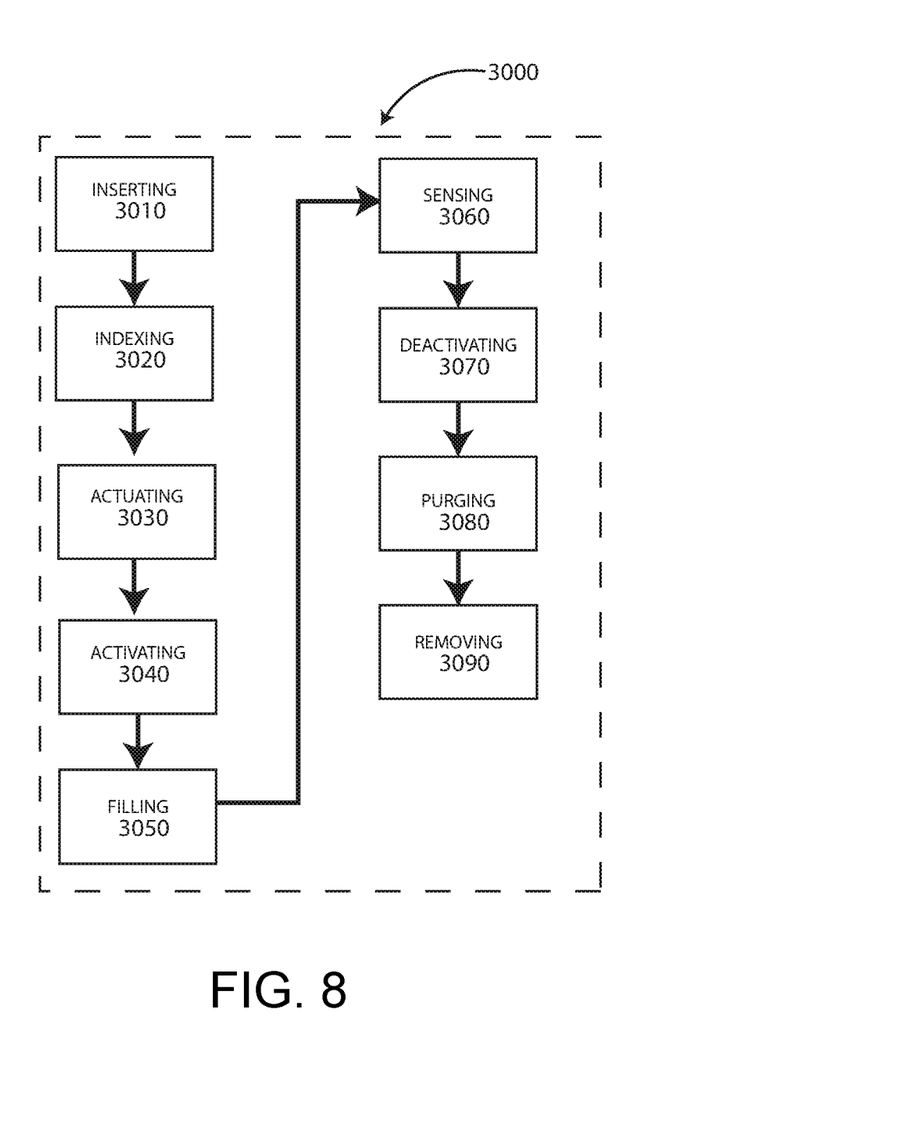
FIG. 8—An embodiment of a method for refilling a system using the delivery apparatus.

Certain embodiments of the present invention, seen in FIG. 8, comprise a method 3000 for the delivery of pressurized product comprising, inserting 3010 an inlet line of a filler device into a receptacle. In certain embodiments, it may be required to perform an indexing 3020 step, to align the quick connection of the sleeve with that of a coupler. The operator then actuates 3030 a valve from a first configuration which blocks the flow of product, to a second configuration. The second configuration allows the delivery of product through the filler device to the receptacle. An operator then activates 3040 a pump which then fills 3050 fluid through the receptacle. When the system has reached a predetermined pressure, the pump or pump truck senses 3060 a change in pressure and deactivates 3070 the pump. Once the pump has been deactivated, the operator actuates the valve from a second configuration to a third configuration. The third configuration allows the flow of product between the filler device and the ambient environment, purging 3080 any high pressure product contained within the line. After purging the filler device an operator then disconnects the device from the receptacle. The disconnection of the device is performed by removing 3090 the inlet line from the receptacle.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A fill gun apparatus for delivering pressurized liquid comprising:
    a valve having a first port, a second port, and a third port;
    an inlet line having a first external diameter, a first end attached to the first port, a second end, and a hole extending between the first end and the second end;
    a first annular ledge located between the first end and the second end of the inlet line, the first annular ledge coincident with the first external diameter of the inlet line;
    the first annular ledge having a first diameter larger than the first external diameter of the inlet line, and the first annular ledge comprising a first surface and a second surface;
    a first circumferential ring coincident with the inlet line located between the second end of the inlet line and the first annular ledge;
    a bushing having a first internal diameter equal to or greater than the first external diameter of the inlet line, a first external diameter, and a second annular ledge having a diameter;
    the bushing disposed over the inlet line with the second annular ledge oriented toward the second end of the inlet line;
    a first washer having an internal diameter equal to or greater than the first external diameter of the inlet line, an external diameter equal to or less than the second external diameter of the bushing, and the first washer being disposed against the second annular ledge with the first washer disposed around the inlet line;
    a first sleeve comprising a first end having a first internal diameter equal to or greater than the first external diameter of the bushing, a second end having a second internal diameter equal to or greater than the first diameter of the first annular ledge, a hole extending between the first end and the second end of the first sleeve, an internal step feature located between the first end and the second end of the first sleeve, and a first external diameter coincident with the first end of the first sleeve;
    the first end of the first sleeve disposed over the bushing, the second end of the first sleeve directed away from the first end of the inlet line, and the internal step feature against the second annular ledge;
    a second sleeve comprising a first end, a second end, and a hole extending between the first end and the second end, the hole of the second sleeve having a first internal diameter equal or greater than the first external diameter of the inlet line, a second internal diameter coincident with the second end of the second sleeve, the second internal diameter equal or greater than the first external diameter of the first sleeve, and an annular ledge coincident with the first end of the second sleeve;
    the second sleeve assembled to the first sleeve with the second end of the second sleeve disposed over the first end of the first sleeve;
    a first pin affixed to the first sleeve, the pin extending radially inward from an inner surface of the first sleeve, the pin located between the internal step feature and the second end of the first sleeve;
    a second washer having an internal diameter equal to or greater than the first external diameter of the inlet line, an external diameter equal to or less than the second internal diameter of the first sleeve, and the washer being disposed against the first surface of the first annular ledge of the inlet line with the second washer disposed around the inlet line; and
    a compression spring disposed between the first washer and the second washer, wherein the first sleeve is rotatably adjustable about the inlet line.

2. The apparatus of claim 1 further comprising a third washer disposed between the second washer and the second end of the compression spring.

3. The apparatus of claim 1 wherein the inlet line further comprises a second circumferential ring coincident with the inlet line and located between the second end of the inlet line and the first annular ledge.

4. The apparatus of claim 1 further comprising a second pin with angular offset from the first pin, and a third pin with angular offset from the first pin and the second pin, the first pin and the second pin extending radially inward from the inner surface of the first sleeve, and the second pin and the third pin located between the internal step feature and the second end of the first sleeve.

5. The apparatus of claim 1 wherein the valve comprises a directional valve having a first configuration which provides a flow path between the first port and the second port and a second configuration which provides a flow path between the second port and the third port.

6. The apparatus of claim 1 wherein the second sleeve further comprises a recess consistent with the first end of the second sleeve.

7. A fill gun apparatus for delivering liquid product into a pressure diverter valve assembly comprising:
    an inlet line having a first external diameter, a first end, a second end, and a hole extending between the first end and the second end;
    a first annular ledge located between the first end and the second end of the inlet line, the first annular ledge coincident with the first external diameter of the inlet line, the first annular ledge having a first diameter larger than the first external diameter of the inlet line, and the first annular ledge comprising a first surface and a second surface;
    a first circumferential ring coincident with the inlet line and located between the second end of the inlet line and the first annular ledge;
    a first sleeve comprising a first end having a first internal diameter equal to or greater than the first external diameter of the inlet line, a second end having a second internal diameter equal to or greater than the first diameter of the first annular ledge, a hole extending the first end and the second end of the first sleeve, and an internal step feature located between the first end and the second end of the first sleeve;

the first end of the first sleeve disposed over the inlet line with the first end of the first sleeve located between the first end of the inlet line and the first annular ledge, and the second end of the first sleeve directed away from the first end of the inlet line, wherein the first sleeve is rotatably adjustable about the inlet line;

a first pin extending radially inward from an inner surface of the first sleeve, located between the internal step feature and the second end of the first sleeve;

a compression spring disposed between the internal step feature of the first sleeve and the first surface of the first annular ledge, wherein the first sleeve is slidably adjustable along the inlet line; and wherein the first sleeve is adapted to rotate about an inlet port coupler comprising a pin retainer to traverse the first pin into the pin retainer.

8. The apparatus of claim 7 further comprising a bushing having a first internal diameter equal to or greater than the first external diameter of the inlet line, a first external diameter, and a second annular ledge having a second external diameter, wherein the bushing is disposed between the inlet line and the first internal diameter of the first sleeve.

9. The apparatus of claim 7 further comprising a first washer having an internal diameter equal to or greater than the first external diameter of the inlet line, an external diameter equal to or less than the second internal diameter of the first sleeve, and the first washer disposed between a first end of the compression spring and the internal step feature; and a second washer having an internal diameter equal to or greater than the first external diameter of the inlet line, an external diameter equal to or less than the second internal diameter of the first sleeve, and the second washer disposed between a second end of the compression spring and the first annular ledge.

10. The apparatus of claim 7 further comprising a second sleeve having a first end, a second end and a hole extending between the first end and the second end, the second sleeve having a first internal diameter equal or greater than the first external diameter of the inlet line, a second internal diameter coincident with the second end of the sleeve equal or greater than the first external diameter of the first sleeve, and an annular ledge coincident with the second end of the second sleeve, wherein the second sleeve is assembled to the first sleeve with the second end of the second sleeve disposed over the first end of the first sleeve.

11. The apparatus of claim 7 wherein the inlet line further comprises a second circumferential ring coincident with the inlet line and located between the second end of the inlet line and the first annular ledge.

12. The apparatus of claim 7 further comprising a second pin with angular offset from the first pin, and a third pin with angular offset from the first pin and the second pin, the first pin and the second pin extending radially inward from the inner surface of the first sleeve, and the second pin and the third pin located between the internal step feature and the second end of the first sleeve.

* * * * *